United States Patent [19]

Ardon

[11] Patent Number: 5,590,129
[45] Date of Patent: Dec. 31, 1996

[54] SINGLE STAGE TELECOMMUNICATIONS SWITCH WITH PARTITIONED PROCESSORS

[75] Inventor: Menachem T. Ardon, Naperville, Ill.

[73] Assignee: Lucent Technologies Inc., Murray Hill, N.J.

[21] Appl. No.: 361,414

[22] Filed: Dec. 22, 1994

[51] Int. Cl.$^6$ .................................................. H04Q 11/04
[52] U.S. Cl. ............................................................ 370/376
[58] Field of Search ........................ 370/68, 58.1, 58.2, 370/60, 60.1, 62, 94.1, 94.2; 379/219, 225

[56] References Cited

U.S. PATENT DOCUMENTS

| | | | |
|---|---|---|---|
| 4,201,889 | 5/1980 | Lawrence et al. | 370/68 |
| 5,014,268 | 5/1991 | Turrell et al. | 370/68 |
| 5,291,479 | 3/1994 | Vaziri et al. | 370/58.2 |
| 5,303,229 | 4/1994 | Withera et al. | 370/58.1 |
| 5,331,632 | 7/1994 | Aaron et al. | 370/68 |

*Primary Examiner*—Douglas W. Olms
*Assistant Examiner*—Shick Hom

[57] ABSTRACT

An arrangement for controlling a large time slot interchange (TSI) unit. The TSI unit is a single stage unit for interconnecting any incoming time slot with any outgoing time slot. No blockage is incurred in such a single stage switch. A plurality of module processors is used each for controlling a group of TSI slices, the size of the group being selected to match the capabilities of the module processor. The module processors communicate with each other in order to cooperate in setting up connections through the TSI unit. Each module processor processes terminating, originating, incoming or outgoing processes for calls connected to the terminals served by the module processor. Advantageously, a large non-blocking TSI unit is made available for serving a large switching system without incurring blockage. Moreover, the TSI unit and its complement of module processors can be arranged to grow in a cost effective manner from a relatively small unit to a unit that is near the largest size practical switching system.

16 Claims, 8 Drawing Sheets

TIME SLOT INTERCHANGE SLICE

SINGLE STAGE TELECOMMUNICATIONS SWITCH WITH PARTITIONED PROCESSORS

TECHNICAL FIELD

This invention relates to arrangements for the control of large telecommunications switching networks.

PROBLEM

Optimum arrangements for matching processor power with network capacity have always presented challenges to the designers of stored program controlled electronic switching systems. In the original switching systems such as the No. 1ESS™, a single powerful processor was used to control any size multi-stage network switch up to the maximum capacity of the processor.

This uniprocessor arrangement, usually augmented by supplementary specialized processors, has continued to be popular but has limited the size of local and tandem switching systems. Furthermore, the uniprocessor being required for any size system imposes a heavy penalty in cost on small switching systems. AT&T's 5ESS® switch described extensively in *AT&T Technical Journal*, Vol. 64, No. 6, Part 2, July/August 1985, pages 1305–1564, has partially solved this problem by providing switch modules each with its own switching module processor and a centralized uniprocessor for controlling common functions of a switch. This system is still limited by the capacity of a uniprocessor and attempts to deload the centralized uniprocessor by assigning tasks to module processors have not completely eliminated the bottleneck. Further, the conventional time-space-time networks currently in use all have undesirable blocking, introduce undesirable cross-office delay inherent in each of the two time slot interchange (TSI) units used in most connections, and increase post-dial delay due to the real time associated with a required path hunt. In the meantime, improvements in the capabilities of time division networks such as the AT&T's SM-2000® network described in *AT&T Technical Journal*, November/December 1994, pages 28–38, based upon AT&T's 5ESS switch, have caused the uniprocessor to become a bottleneck again. Such systems favor the use of a large single stage digital switch, such as a large time slot interchange (TSI) unit, but no processors are available to control the single stage switching networks required for large switches. A problem of the prior art, therefore, is that there is no processing arrangement which is cost effective both for small and large sizes of TSI units, wherein processor resources can be matched to processing needs, and which allows such units to increase in size as the technology advances.

SOLUTION

The above problem is solved and a contribution is made to the prior art in accordance with applicant's invention which uses a single stage time slot interchange (TSI) unit (time switch) and which uses a module processor for each subgroup of elements of the time switch, the size of the subgroup being matched to the capabilities of the processor. In a single stage time switch any input may be connected to any output without encountering blocking.

In accordance with one preferred embodiment such a TSI unit establishes all switching network connections for a stand-alone central office, toll office, tandem office or combined switching system.

In accordance with one preferred embodiment of the invention the time switch is divided into a plurality of interconnected time slices each time slice for transmitting from and receiving to a group of time slots of the large time slot interchange unit. Each module processor controls a group of time slices, the size of the group being selected to match the capabilities of the processor and the type of traffic being switched through the time slices of that processor. Advantageously, the size of the portion of the total time switch which is controlled by each module processor is matched to the processing capabilities of that processor.

In accordance with one specific implementation of applicants' invention, the call control processors for such a time switch comprise a group of switch module processors and a central processor. The module processors flexibly communicate with each other through a packet network.

Alternatively, each processor has its own dedicated time slots, connected to all other processors through the time switch, for transmitting messages. Advantageously, the processors communicate with each other using the capabilities of the time slot interchange unit without requiring a special packet network.

In accordance with one preferred embodiment of the invention, the central processor performs such functions as selecting a trunk for an outgoing call. Since the time slot interchange unit is a nonblocking switch, it is only necessary for a switching module processor at one end of the connection to know the identity of the selected peripheral time slot for communicating with a terminal at the other end; this identifies the time slot used for a connection. Because no path hunt is necessary this function need not be performed by a central processor.

When an originating call is to be connected to another switching system the identity of the terminating number is transmitted from the switching module processor processing the origination, i.e., the originating processor, to the central processor. The central processor then selects a trunk for serving this call and transmits a message back to the originating switching module processor to inform that processor of the identity of the outgoing trunk. The originating module processor then transmits a message to the processor controlling the time slice to which the outgoing trunk is connected (the terminating module processor) and transmits to that processor the identification of the time slot for connecting the originating line to the outgoing trunk. The terminating module processor then seizes the outgoing trunk. The peripheral time slot of the outgoing trunk identifies the time slot to be connected to the originating line. The terminating module processor then controls the connection of that time slot to the time slot indicated by the originating switching module processor, and requests the originating module processor to control the corresponding connection.

In accordance with an alternative configuration of applicant's invention, no central processor is used. Instead, the functions of the central processor are assigned to one or more of the module processors, but the function remains centralized. Advantageously, in smaller switches, no additional central processor is required.

For the case of a connection to a called directory number (intra-office or incoming call), a module processor having translation information for the block of 1000 directory numbers within which the destination directory number is to be found specifies the time switch location and therefore the processor for serving the destination line.

In the case of an originating call requiring the use of an interoffice trunk, the originating processor is provided with the identity of the processor responsible for hunting for a trunk for a given destination set. This is the central processor in the preferred embodiment and one of the module processors in the alternative embodiment. The trunk hunting processor then selects the trunk and reports the selection to the originating processor. The originating processor then identifies the terminating processor for controlling the selected trunk. The terminating processor selects the time slot for accessing the trunk. In the alternative embodiment, different module processors may be used for hunting for a trunk to different destination sets.

Advantageously, in the preferred or alternative embodiment, for any call, one processor is responsible for controlling the originating or incoming process while a second processor (which may be the same as the first processor) is responsible for controlling the terminating and outgoing process. Since many switching systems are designed advantageously to operate with originating and terminating processes, the software conversion for controlling such a system becomes relatively straightforward.

DETAILED DESCRIPTION

Figure 1:
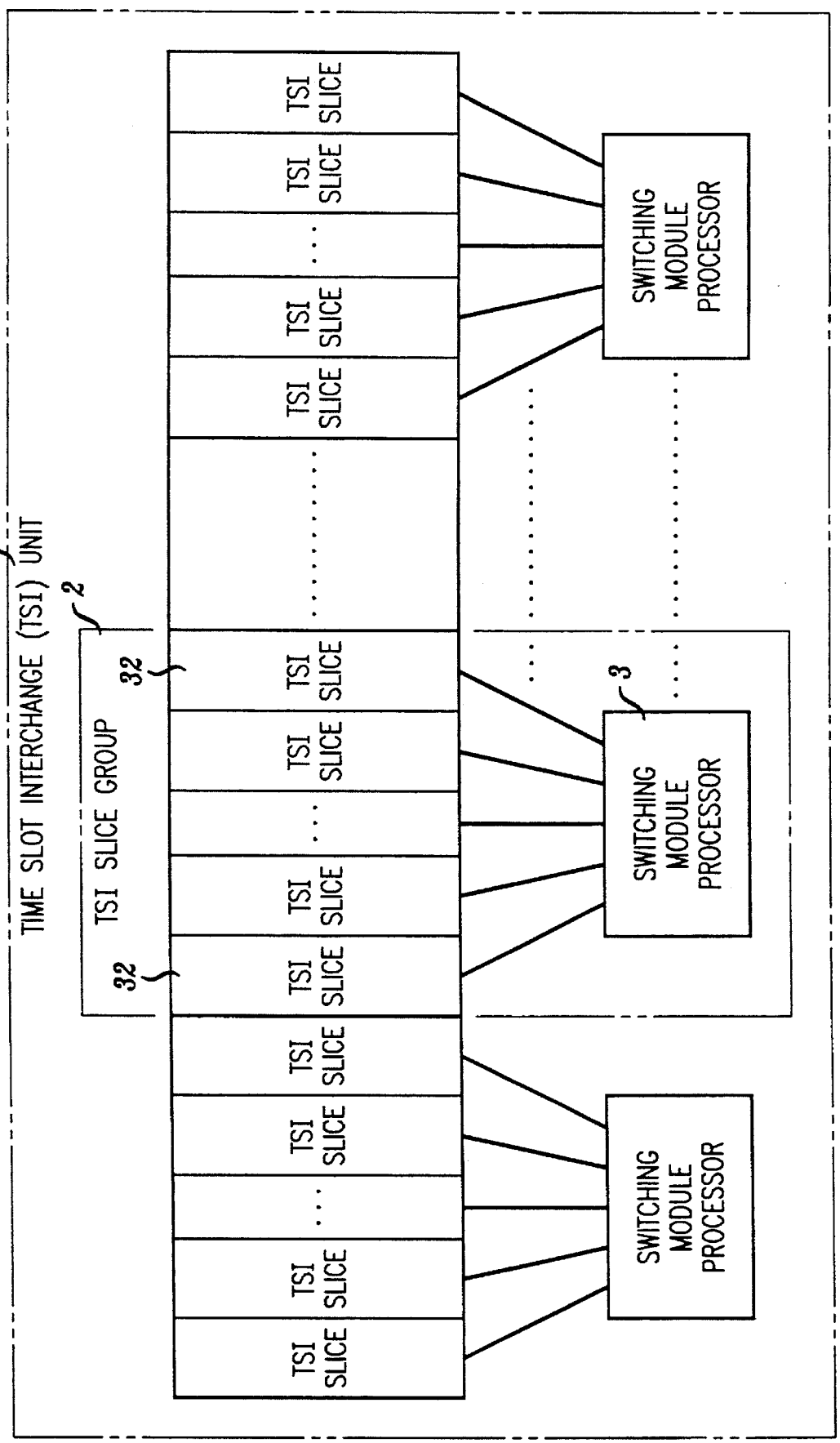
FIG. 1 is a block diagram of a large single stage TSI unit and its controls.

FIG. 1 is a block diagram illustrating a basic principle of applicant's invention. Block 1 which is the entire figure comprises a large single stage time slot interchange network comprising a plurality of TSI slices (shown in detail on FIG. 3) and another plurality of switching module processors 3. Each of the switching module processors controls a group of TSI slices to form a TSI slice group 2. The TSI slice group is one entity from the point of view of control, but the entire TSI unit 1 is a single stage TSI system in which a connection can be made between any time slot of any TSI slice and any other time slot of the same or any other TSI slice of unit 1. The connections are set up to be two-way connections so that whenever a connection is established to convey data from a first time slot to a second time slot, a corresponding connection is automatically established to convey data being transmitted in the opposite direction from the second time slot to the first time slot. In alternative embodiments, the control signals that actually establish a path may originate from a processor of the TSI unit other than the module processor of the time slice group being controlled; however, the source of the information for establishing connections is the module processor of the time slice group being controlled.

In accordance with the preferred embodiment described herein, each TSI slice group is connected to its own group of service circuits for serving the lines and trunks connected to that TSI slice group. As will be described hereinafter with respect to FIGS. 2 and 3, these service circuits are connected to one or more TSI slices of the group via the arrangement for connecting peripheral equipment to the TSI slice. This allows connections to be established between lines or trunks and a service circuit. Service circuits are units such as dual tone multifrequency (DTMF) receivers, tone generators and data transceivers (for example, for exchanging CCS7 messages with other switching systems), alerting (ringing) circuits. In some cases, the service circuits are associated with line or trunk units. For example, an alerting (ringing) circuit may be provided by a circuit directly associated with a line unit. For low runner, complex (global) service circuits such as conference circuits, a service circuit may not be provided for every TSI group and connections to such service circuits are processed by and under the control of the module processors of two TSI slice groups.

Each module processor is also provided with a connection to one or more time slots in the TSI slices which that processor controls. This permits direct data connections between a module processor and units such as service circuits or data link controllers or when appropriate allows for the establishment of data connections between equipment switchably connected to the TSI unit and the module processor.

For those trunks which use common channel signaling, the common channel signaling messages enter the TSI unit in one or more time slots of one or more TSI slices and are routed to the module processor for controlling that TSI slice. This processor then routes the CCS7 message to the module processor controlling the TSI slice in which the trunk associated with the CCS7 message is terminated.

Figure 2:
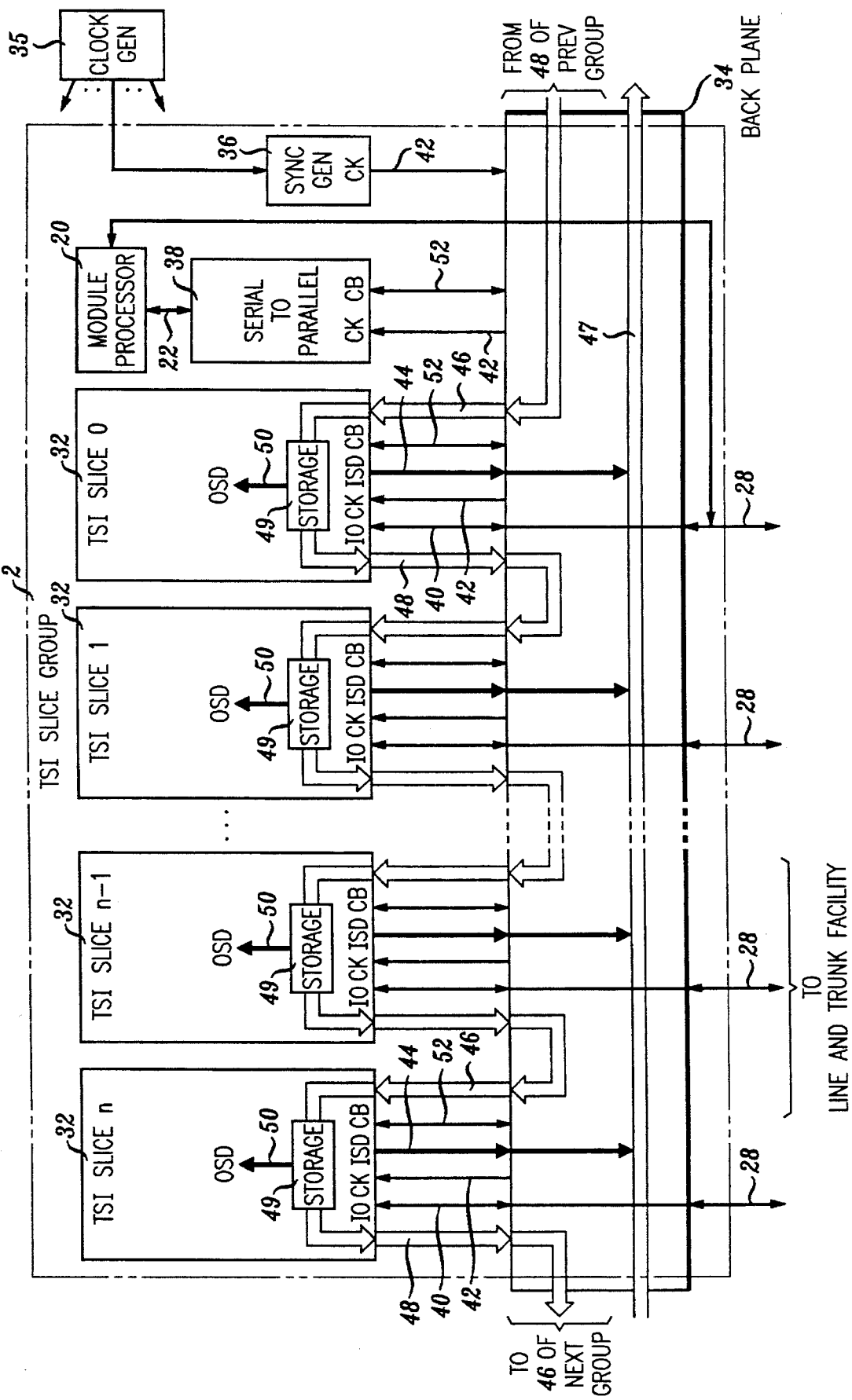
FIGS. 2 and 3 are block diagrams of subunits of the TSI unit of FIG. 1.

FIG. 2 is a diagram of one TSI slice group. In addition, FIG. 2 shows a clock generator 35 which serves the entire TSI unit 1, and a sync generator circuit 36 which serve all of the TSI slices of a TSI slice group 2. In alternative embodiments, a single sync generator may serve several time slice groups. FIG. 2 also shows that input/output leads 28 are connected to peripheral units 29 for interfacing with lines, trunks, data links, and other circuits connected to the TSI slice group. One of these units is the service circuit 27 previously discussed with respect to FIG. 1. Another is the module processor of the TSI slice group which has a connection 31 to one of the peripheral systems 29 for gaining access to a TSI slice. The basic TSI slice of this preferred embodiment is that described in U.S. Pat. No. 5,331,632 issued to C. Aaron and R. J. Canniff on Jul. 19, 1994.

FIG. 2 also shows the connections between TSI slice groups. These are made in the backplane and lead bundle 48, extends out of the portion of the backplane devoted to a particular TSI slice group and is treated as lead bundle 46 of the next group. Similarly, lead bundle 48 from the previous group becomes lead bundle 46 of the first module of this group. The lead bundle 47 goes across all TSI slice groups and is eventually terminated as lead bundle 46 of the first TSI slice within the first TSI slice group.

FIG. 2 illustrates an embodiment of a time slot interchange slice group 2 in accordance with the present invention. A plurality of time slot interchange slices 32 represent physically separated modules or printed circuit boards substantially identical in function and operation. In the illustrative embodiment, or time slot interchange slices TSI/0-TSI/n are employed to provide a time slot interchange group 2. Each TSI slice 32 is coupled to a backplane 34 which serves to interconnect the slices to each other and to the interface units (not shown) via channels 28. A common clock generator 35, whose output is used by the entire TSI unit 1, and an individual sync generator 36, whose output is used by the TSI group 2, provide clock and synchronization information to the TSI slices and to a serial-to-parallel converter 38. The sync generator is also coupled to module processor 20 and facilitates clock and synchronization between the switch controller and the time slot interchange slice 32. The serial-to-parallel converter 38 provides a data communication link between the switch controller and the time slot interchange slices. The switch controller provides instructions to the time slot interchange slices via control bus 52 and controls the input/output time slot correlation and other functions of the TSI slice as explained below. As used herein, bus refers to all forms of a communication path.

A plurality of communication channels exist between each TSI slice 32 and other devices via the backplane 34. A bidirectional input/output channel (IO) 40 couples input data sent from external sources via channels 28 and the backplane 34 to the TSI slices 32. Channel 40 also carries output data transmitted from the TSI slices to external devices via channels 28 and backplane 34. The output data is derived from information contained in selected ones of the inbound time slot information stored in TSI slices 32. A communication channel 42 couples clock and sync information between the TSI slices 32 and the clock/sync generator 36.

The input data received by each TSI slice on channel 40 is redistributed as inbound slot data (ISD) on channel 44 and combined on channel 46 to form parallel frames of inbound time slot information. Thus, distribution bus 46 contains all the frames of inbound data received by the TSI slices during each TSI frame. A TSI frame consists of the time interval in which a frame of input data is received via channel 40 and a corresponding frame of output data is transmitted over channel 40. The information contained in the inbound frame from bus 46 is stored in TSI slice 0 during one TSI clock period and retransmitted to the next adjacent slice TSI slice 1 via communication channel 48. A TSI clock period is the time required to receive a set of frames of input data via bus 46; it is also the time required to transmit a set of frames of input data via bus 48. Thus, all input data received during a TSI frame is sequentially received by each TSI slice via channel 46, stored in storage element 49 in each slice, and transmitted to the next adjacent TSI slice via channel 48. In this manner, each slice retransmits the information to the next adjacent slice in a "daisy-chain" technique. It will be apparent that TSI slice n being the last slice in the illustrative slice group embodiment, has the requirement to further retransmit the information. In the last slice of the last TSI group, to the first TSI slice of the next group, in order to standardize the manufacture of the TSI slices and to accommodate further growth, bus 48 is routed back to the backplane by TSI slice n of the last TSI slice group, even though the transfer of information on this bus at the backplane is not utilized.

Outbound time slot data (OSD) is carried by channel or bus 50. The OSD consists of selected inbound time slot information stored in each TSI slice and is retransmitted as output data on channel 40 to external devices via backplane 34. The selection of the inbound time slot information functions is the technique by which an inbound time slot is switched to an outbound time slot. Since each TSI slice stores all inbound time slots during a TSI frame, the OSD can carry outbound time slot information corresponding to information contained in any of the inbound time slots. As will be explained in greater detail below, the OSD is determined by a control random access memory (CRAM) on each slice. The control memory stores control information transmitted from the switch controller 20 by serial-to-parallel converter 38 on control bus 52 to the control memories on each slice.

As the number of TSI slices increases, the propagation delay for inbound data to be distributed from TSI slice 0 to the last TSI slice will increase. Each TSI slice introduces a delay of at least one TSI clock period. However, due to timing considerations, it may be desirable to introduce additional TSI clock periods of delay such as one to receive the time slot data on bus 46 and one to transmit the time slot data via bus 48 to the next TSI slice. Data is received from external sources via channel 40 by each TSI slice in frame synchronization. Similarly, output data is desirably transmitted by each TSI slice over channel 40 to external devices in frame synchronization. Because of the delay introduced by the daisy-chain distribution technique, each TSI slice preferably resynchronizes the output data to be transmitted over channel 40 relative to the position of the TSI slice to TSI slice 0. Where two TSI clock periods per TSI slice are used, TSI slice 0 introduces the largest transmission resynchronization delay of 2×(N–1) TSI clock periods, where N equals number of TSI slices for the TSI unit, in order to account for the delay between TSI slice 0 of the TSI unit, and TSI slice N of the TSI unit of the daisy-chain data transmission. Although the individual TSI slices receive the inbound time slot data over channels 46 and 48 at different TSI clock periods, each preferably transmits output data via channel 40 in frame synchronization.

The bus acts like a double ring to interconnect the TSI slices. As is well known in the prior art, for example, U.S. Pat. No. 4,460,994, double rings can be made more reliable by providing an inter-ring by pass to transmit data from one ring to the other whenever a failure of a node at one point of the rings is detected. In this case, provision of a switchable connection between busses 46 and 47 at each TSI slice (or at each TSI slice group) performs the function of making the ring more reliable and capable of surviving an outage of one of the TSI slices.

Figure 3:
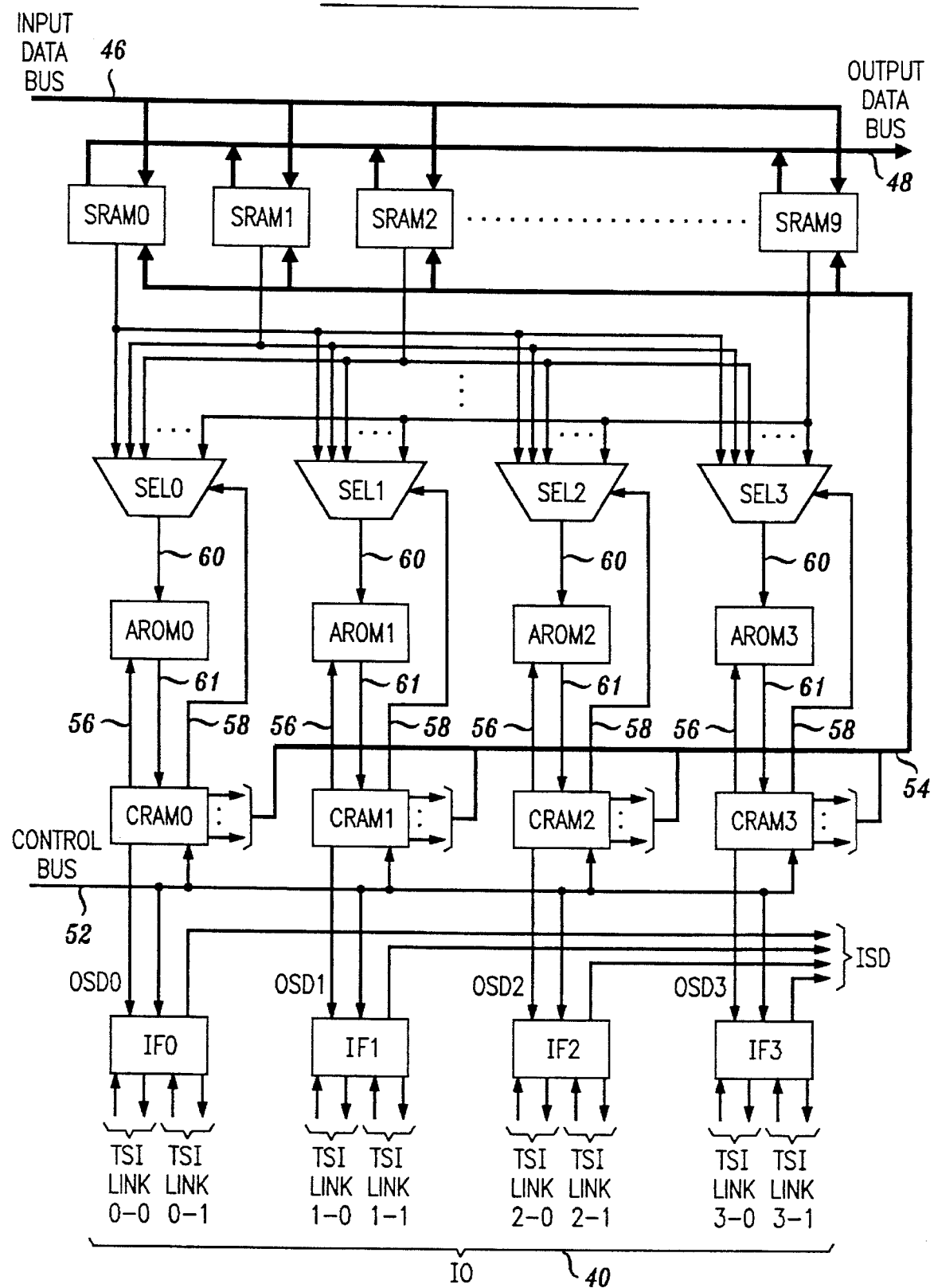

FIG. 3 is a block diagram of a time slot interchange slice 32 in accordance with an embodiment of the present invention. Interface modules IF0–IF3 selectively link four of eight pairs of duplex communication channels, TSI links 0—0, 0-1; 1-0, 1—1; 2-0, 2-1; 3-0, 3-1, to the four incoming slot data (ISD) channels and the four outbound slot data lines OSD0–OSD3. Each interface module functions as a multiplexer permitting a 2:1 fan-in/fan-out of dam and is controlled by commands sent by the switching module 20 over control bus 52.

Control random access memory units CRAM0–CRAM3 receive and store control (command) data transmitted from the switch controller via control bus 52. Each CRAM is connected by bus 54 to the address and chip select lines associated with static random access memory units SRAM0–SRAM9. Each inbound time slot in a TSI frame is stored at a separate predefined memory address in SRAM0–SRAM9. Each CRAM is capable of addressing each memory location in each SRAM. This access capability is utilized to select information corresponding to one inbound time slot for transmission during an output time slot.

Each CRAM is also connected by channel 56 to a corresponding amplitude controlling read-only memory AROM0–AROM3. Each AROM functions as a look-up table and is utilized to condition information selected from an SRAM prior to retransmission as output data. The AROM addressing is dependent on the PCM data retrieved from a location in a SRAM and on control data sent to the AROM over channel 56 from the corresponding CRAM. The data output on channel 61 by the AROM represents PCM data received from the SRAM with increased, no change, or decreased amplitude. Each CRAM provides control information to a corresponding AROM that determines if attenuation or amplification is to be provided, and if so, the amount. Each CRAM is connected by a channel 58 to a corresponding selector SEL0–SEL3. In response to a selection command sent from a CRAM via channel 58, each selector selects one of the SRAM's and couples the information stored at an address location in the selected SRAM as an output of the selector on line 60.

The input bus 46 is coupled to each SRAM and consists of four buses for each TSI slice. Thus, in the illustrative embodiment, bus 46 would comprise 40 (4×10) separate buses with each bus carrying one frame of inbound time slot data during a TSI frame. Output bus 48 also coupled to each SRAM is similarly configured and carries the information stored in the SRAM's to the next TSI slice. Thus, SRAM0–SRAM9 must store in the aggregate 40 frames of information. The organization of each SRAM and CRAM is explained below. In the interest of readability, clock signals are not shown on FIG. 3. However, those skilled in the art will appreciate that clock signals are distributed to each of the elements shown in FIG. 3.

Figure 4:
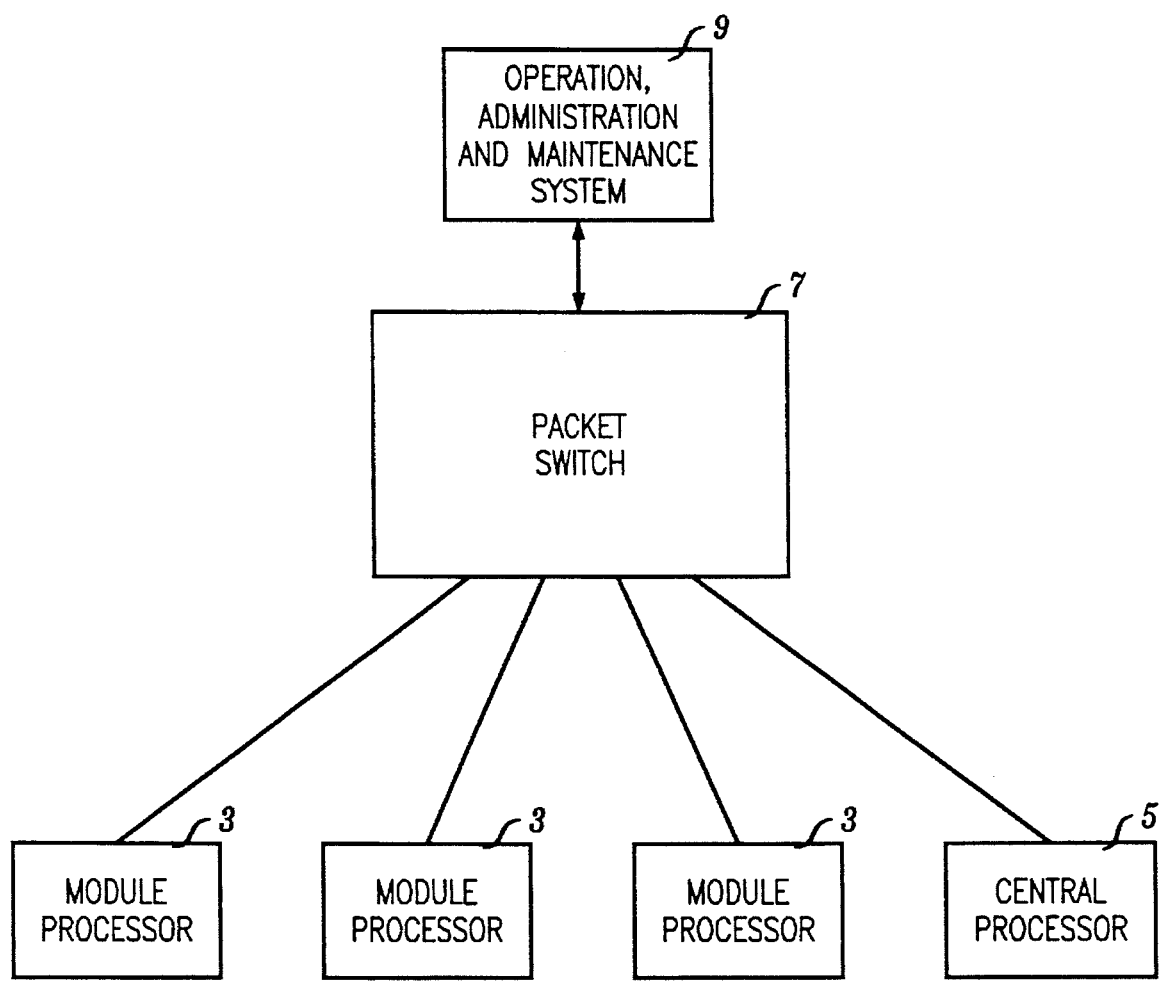
FIG. 4 is a block diagram of a processor complex for controlling the TSI unit of FIG. 1.

FIG. 4 is a block diagram of the preferred embodiment of the processor complex of applicant's invention. Each of the module processors 3 are connected to a packet switch 7. This type of configuration is desirable because a large number of short messages are exchanged among all the processors that control the TSI unit. The packet switch can be a unit such as the message switch of AT&T's 5ESS® switch described for example in the previously referenced *AT& Technical Journal*, July/August 1985, pages 1341–2. In the preferred embodiment, a central processor 5 is also connected to the packet switch. In the preferred embodiment, this central processor performs functions which are better performed on a centralized basis. One such example is the process of selecting an outgoing trunk and outgoing trunk on an outgoing call wherein a centralized control of the process offers major administrative advantages. The role of the centralized processor can also be given as part of the functions of one of the module processors and/or different central processor functions can be allocated among different module processors. The choice among these alternatives depends on the amount of processing required for those functions which are deemed to be more effectively accomplished by a centralized as opposed to distributed processing arrangement.

The packet switch 7 is also connected to operation support systems 9 via a data link which may or may not be switched through the TSI unit. This connection allows the operation support systems to update memory, such as the office data base of the module processors and central processor, and allows the operation support systems to read status information from these processors.

The connections between the module processors and the packet switch can be either via dedicated data links or, in the preferred embodiment, via the TSI unit.

In an alternative embodiment, the communications between processors are made directly through dedicated time slots. Such an arrangement requires each processor to receive messages over a plurality of channels and appears to be less straightforward than a connection through a packet switch, especially in view of the large number of short messages that flow between processors.

Figure 5:
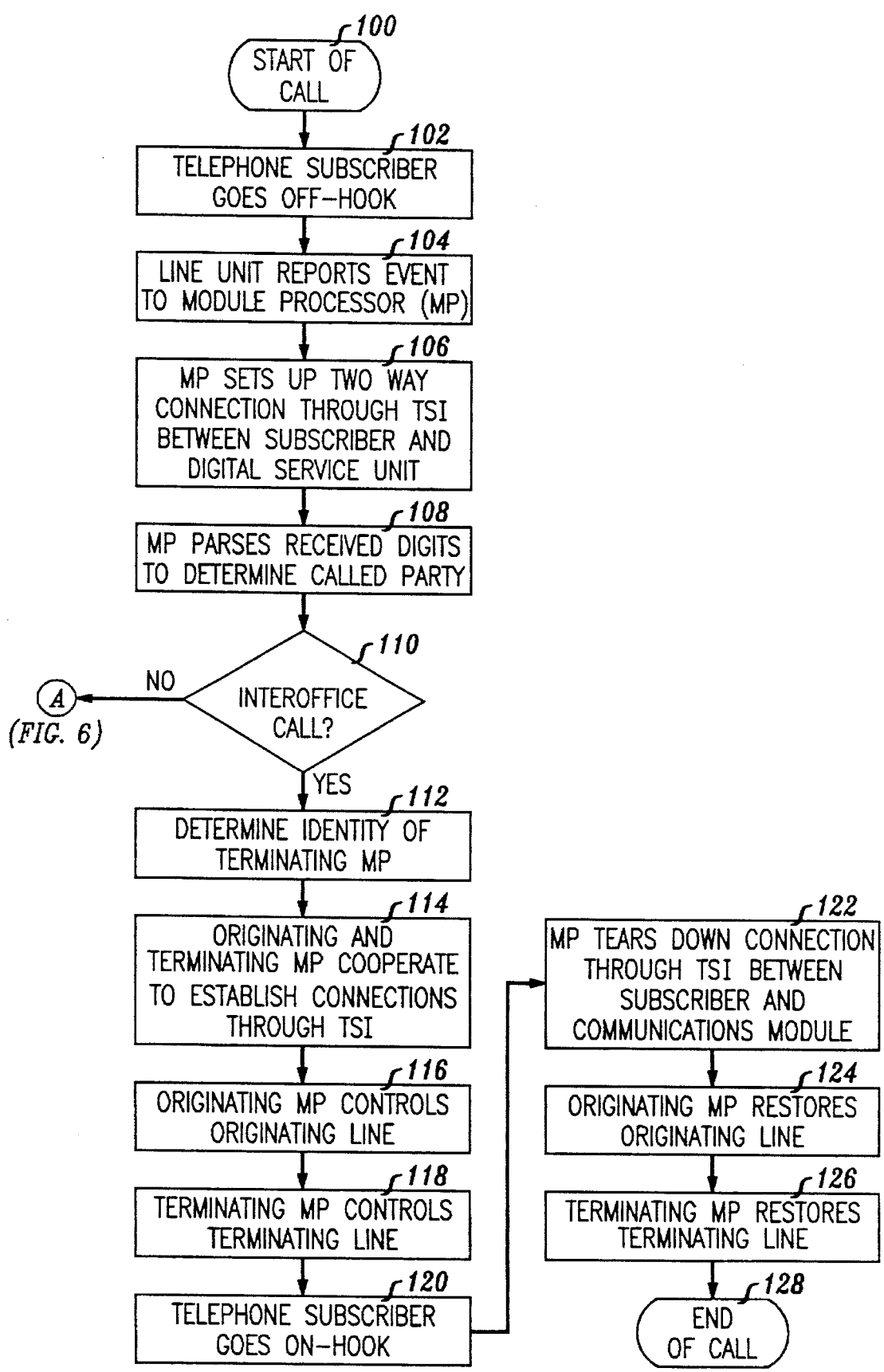
FIGS. 5-7 are flow diagrams of methods of establishing intra-office calls, outgoing calls and incoming calls in accordance with applicant's invention.
Figure 6:
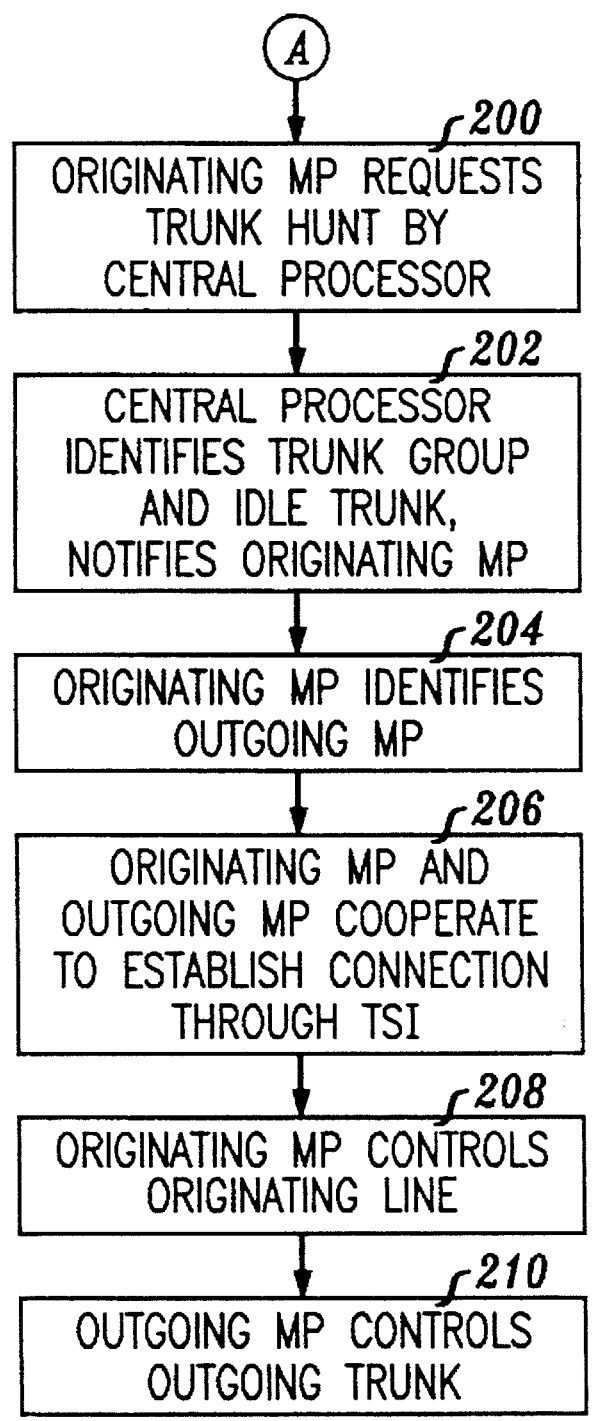
Figure 7:
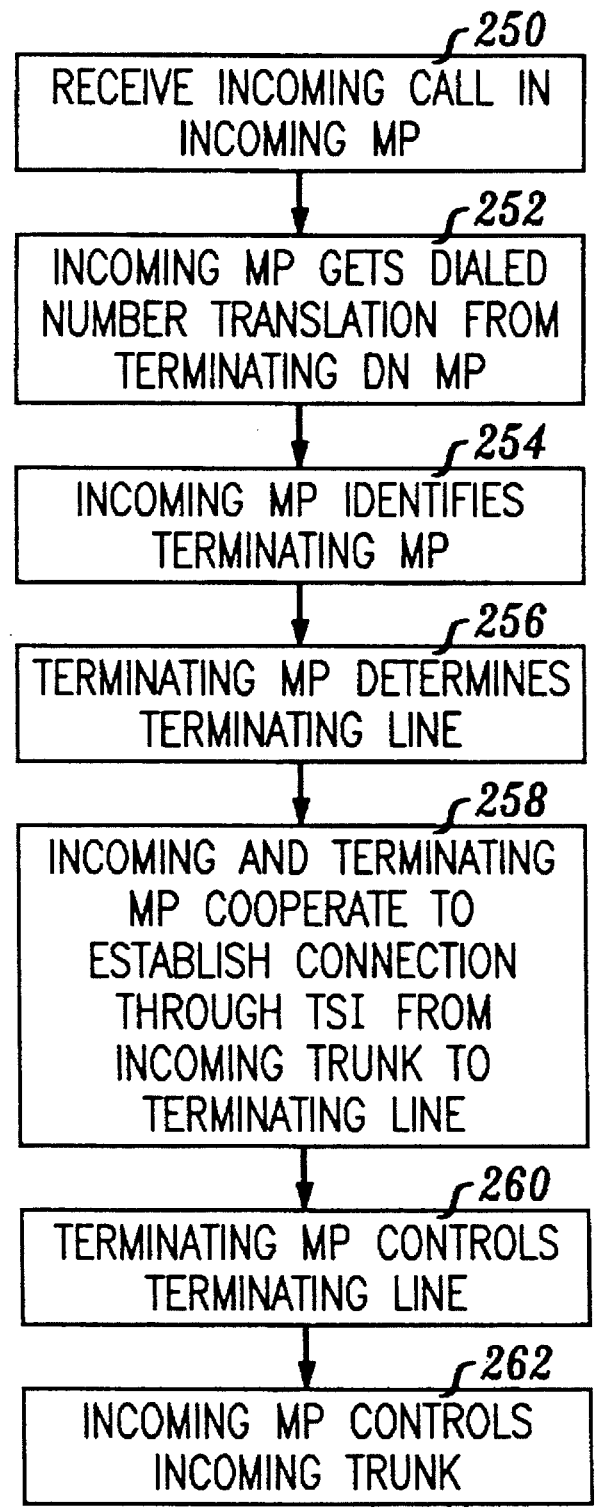

FIGS. 5–7 illustrate the basic types of telephone calls which are processed in this system, namely, inn-office, outgoing, and incoming calls. An intra-office or outgoing call begins when the telephone subscriber goes off hook (action block 102, FIG. 5). The line unit, which detects the origination, sends messages reporting such events to the module processor controlling the TSI slice to which the telephone subscriber is connected (action block 104). The line unit reports this condition to the module processor by transmitting messages from which the identity of the line that went off hook can be derived and the indication that the signal being reported is a transition to off hook. These messages are sent to the module processor over the control bus 52. The module processor then sets up a two-way connection through the TSI slice group between the subscriber and digital service unit 27 which contains service circuits for detecting subscriber signals. The module processor obtains the class of service of the calling subscriber from records stored in the module processor (backed up in mass storage at an operation support system and/or the centralized processor). Using this class of service translation, the module processor parses the received digits transmitted from the digital service unit 27 and determines basic characteristics of the called party. Test 110 determines whether this is an intra-office call. If not then the actions of FIG. 6 are executed staffing with action block 200. If this is an intra-office call then the module processor serving the calling subscriber determines the identity of the module processor serving the terminating party (action block 112). This determination can be made in one of several ways: different module processors may have directory to equipment number translations for different blocks of numbers and each module processor has a table indicating which module processors have translations for which blocks of directory numbers. The appropriate module processor is then queried to identify the module processor associated with the called directory number, and for directory numbers having a single line associated therewith, an equipment number. That appropriate module processor then responds to the module processor serving the originating subscriber with this information and the module processor of the originating subscriber determines the identity of the terminating module processor from this information. This is the preferred embodiment. Alternatively, each module processor can have a complete set of translations for identifying the terminating line, hence the terminating module processor for each directory number directly. A third alternative is to use the central processor for making the directory to equipment number translations required to identify the terminating line and module processor and required by the terminating module processor to properly control the terminating portion of the call.

Special problems occur when the terminating number is that of a multiline hunt group wherein one terminating number represents a number of different lines usually for a liability terminated on different TSI slices and different TSI slice groups. In the preferred embodiment the processor which makes the directory to equipment number translation also performs the selection of the desired terminating line from among idle lines of the group. This is straightforward when only one processor performs the translation for any particular directory number but is less straightforward if all processors are provided with the directory number translations. In the latter case a processor is assigned to perform the selection for a multiline hunt group and this processor provides the needed information to the originating processor.

At this point the originating processor has the identity of the terminating line and the module processor for serving that terminating line (the terminating module processor). The originating module processor communicates with the terminating module processor and the two cooperate to establish a connection between the calling and called subscribers through the TSI unit (action block 114). This cooperation is accomplished by having the originating module processor select a time slot connectable to the originating subscriber and by having the terminating module processor select a time slot connectable to the terminating subscriber: since such selected time slots are initially idle (otherwise they would not have been selected) a path automatically exists between the two time slots and this path is established by initializing the memories in the TSI slice connected to the originating subscriber and to the TSI slice connected to the terminating subscriber.

Thereafter the originating module processor controls the originating line (action block 116) and the terminating module processor controls the terminating line (action block 118). This is in conformance with a preferred mode of call control wherein a separate process under the control of a processor is used to control each half of a line to line or line to trunk connection. Subsequently, one of the telephone subscribers goes on hook (action block 120) the originating in response to this action the originating module processor tears down the connection through the TSI unit (action block 122). The originating module processor then restores the originating line (action block 124) and the terminating module processor then restores the terminating line (action block 126).

FIG. 6 is a flow diagram of the actions performed on an outgoing call. The initial actions have been described in FIG. 5 up to decision block 110. If the decision in decision block 110 is that this is not an intra-office call then this is an outgoing call and the originating module processor requests a trunk hunt by the central processor (action block 200). (Note that this is for the preferred embodiment as discussed with respect to FIG. 4 a separate central processor is not required in alternative embodiments of applicant's invention.) The central processor identifies the trunk group for completing the call and an idle trunk in that trunk group and notifies the originating module processor of the equipment location and identity of the trunk group and the selected idle trunk. The various options for selecting an idle trunk for a call are well understood by those of ordinarily skill in the art; for example, the central processor could send a list of idle trunks for selection by the module processor. The originating module processor identifies the module processor for serving the outgoing trunk (i.e., the outgoing module processor), (action block 204). The originating module processor and outgoing module processor cooperate to establish a connection through the TSI unit (action block 206). Thereafter the originating module processor controls the originating line (action block 208) and the outgoing module processor controls the outgoing trunk (action block 210). The latter actions include signaling to the switching system at the other end of the outgoing trunk. If the signaling method is common channel signaling then the outgoing MP prepares a CCS7 message, in this case an initial address message for transmission to the switching system at the other end of the outgoing trunk. This message is then transmitted from the outgoing MP to a data link controller. In the preferred embodiment the message is transmitted to the data link controller over a connection through the TSI an alternative embodiments the packets switch interconnecting the module processors can also be connected to the data link controllers.

If multifrequency (MF) signaling is used, the outgoing MP seizes an MF transmitter for transmitting the called number to the connected switching system: the MF transmitter transmits over a connection in the TSI unit using the same time slot for accessing the outgoing trunk as is used for the subsequent conversation whose TSI connection is described with respect to action block 206.

FIG. 7 is a flow diagram of actions performed for serving incoming calls. An incoming call is received in association with a trunk served by an MP referred to here and after as the incoming MP. The incoming MP may receive either a CCS7 message which is routed to the incoming MP from the MP that receives CCS7 messages for CCS7 messages for trunk groups that include the specific incoming trunk. The incoming MP identifies the terminating MP (action block 254) in an action essentially the same as the action described in action block 112 (FIG. 5). The terminating NIP then obtains terminating line class translations (action block 256) an action essentially the same as action block 113 previously described with respect to FIG. 5. For the case of a tandem call, the trunk translations performed are similar to those for an outgoing call, and the terminating actions are essentially those performed for such an outgoing call, except that the actions performed by the originating module processor are now performed by the incoming module processor. Thereafter for the incoming call, the incoming and terminating MP cooperate to establish a connection through the TSI unit from the incoming trunk to the terminating line (action block 258) an action essentially the same as the action performed in action block 114, FIG. 5. Thereafter the terminating MP control the terminating line (action block 260) and the incoming MP controls the incoming trunk (action block 262). As noted with respect to outgoing trunk the incoming MPs control of the incoming trunk includes exchanging CCS7 messages with the switching system at the other end of the trunk if the trunk is a common channel signaling trunk.

Figure 8:
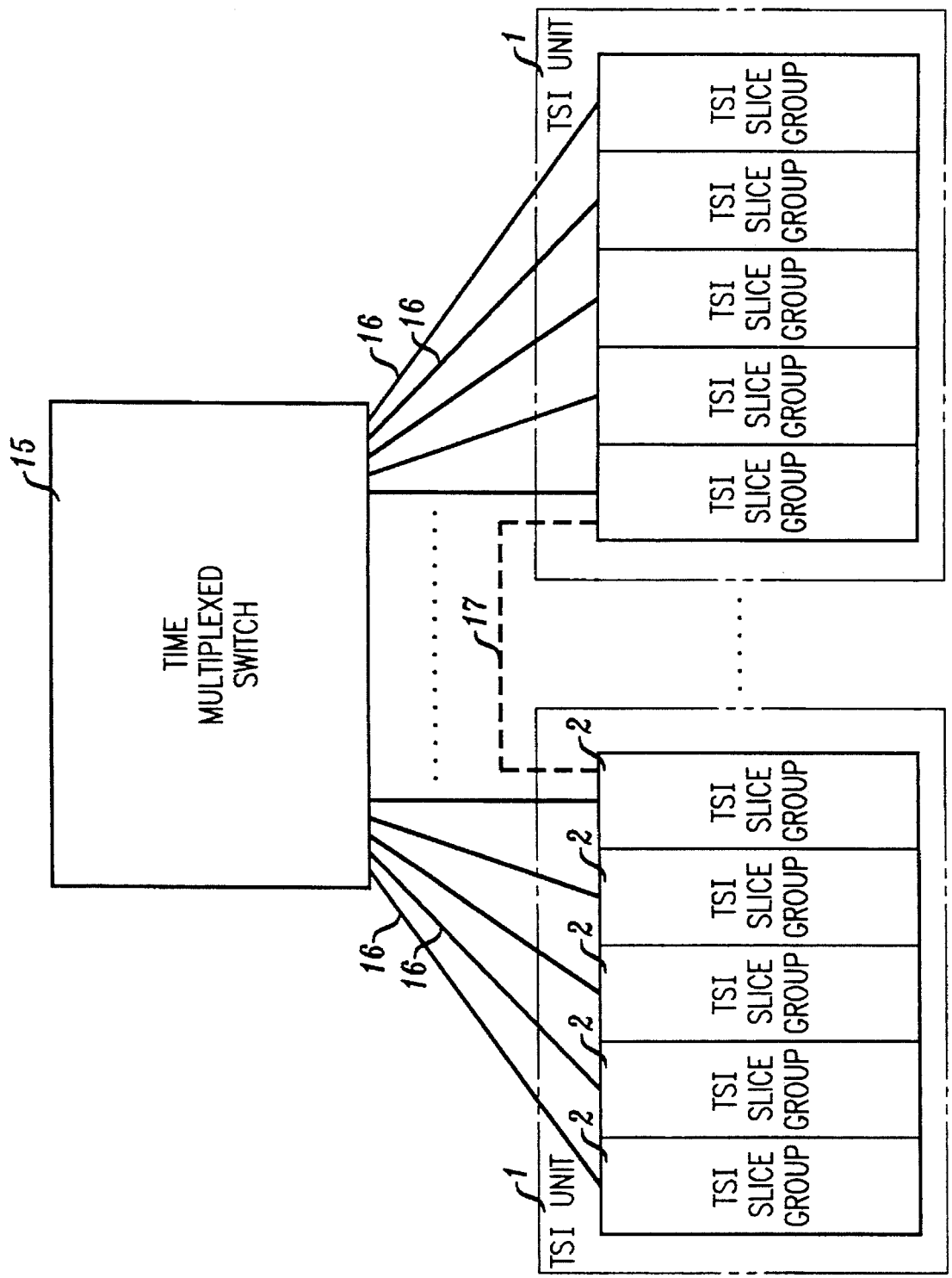
FIG. 8 is a block diagram of a large switching system comprising a plurality of the TSI units of FIG. 1 interconnected by a time multiplexer switch.

FIG. 8 illustrates how a group of TSI units 1 can be interconnected using a time multiplexed switch (TMS) 15. The time multiplexed switch is, for example, of the type used in AT&T's 5ESS switch described in the previously mentioned papers. For such a switch, connections to the TSI unit 1 are via NCT (Network Control and Timing) links 16 similar to those used in the 5ESS switch. By making connections from each TSI slice group 2 to the TMS 15, the module processors of each TSI slice group perform essentially the same functions as are performed by individual module processors in the 5ESS switch, since no intermediate processors are required to make a connection to the TMS. Further, each TSI unit can establish calls within the TSI unit as discussed heretofore. For a remote TSI unit, the intra-TSI unit capabilities permit stand-alone capability, an important requirement for remote units. Advantageously, this arrangement allows for a very large switch using the TSI units described herein.

The TMS can also be used to access the packet switch 7 (FIG. 4) from each of the module processors. Alternatively, direct links from each TSI unit can connect the module processors to the packet switch.

For large switches having a relatively small number of TSI units, inter TSI unit links, such as the dashed 17 link shown on FIG. 8, can be used instead of requiring a TMS switch. This is likely to be adequate for switching the relatively small amount of traffic that goes between TSI units when such units are as large as the ones described herein if a conscious effort is made to prefer intra TSI unit connections as described in Ardon et al.: U.S. Pat. No. 5,119,366, issued Jun. 2, 1992.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A single stage time slot interchange TSI unit for interconnecting a plurality of telecommunications transceiver comprising:

a plurality of TSI slices each for transmitting and receiving signals of a group of time slots, said plurality of TSI slices interconnected to form a single stage TSI switch for interconnecting all time slots of said plurality of TSI slices; and A plurality of module processors, each for controlling a separate subset of said TSI slices;

Wherein a connection between a first telecommunications transceiver connected to a first TSI slice controlled by a first of said module processors and a second telecommunications transceiver connected to a second TSI slice controlled by a second of said module processors is established through cooperative actions by said first and said second module processors;

Wherein said first module processor transmits a message to said second module processor identifying a first time slot and said second module processor transmits a message to said first module processor identifying a second time slot and wherein a connection is established by having said first module processor control said first TSI slice to establish a connection between said first time slot and said second time slot and said second module processor controls said second TSI slice to establish a connection between said second time slot and said first time slot whereby a connection is established between time slots connectable to said first and said second telecommunication transceiver.

2. The apparatus of claim 1 further comprising:

means for connecting said first and said second TSI slice to said first and said second telecommunications transceiver respectively and wherein said first and second module processor controls the connection between said first and said second transceiver and said first and said second time slot respectively.

3. The apparatus of claim 1 further comprising packet switch means for interconnecting said plurality of module processors.

4. The apparatus of claim 3 wherein said packet switch means is connectable to an operations support system for carrying out operations administration and maintenance functions for said plurality of telecommunications transceivers and said TSI unit.

5. The apparatus of claim 3 wherein said module processors are connected to said packet switch means via ones of said TSI slices.

6. The apparatus of claim 1 further comprising a central processor for executing a set of functions for said plurality of module processors.

7. The apparatus of claim 6 wherein said central processor performs the function of selecting an outgoing trunk for an outgoing call from a telecommunications transceiver connectable to one of said TSI slices.

8. The apparatus of claim 6 wherein functions of said central processor are performed by ones of said module processors whereby no separate central processor is required.

9. The apparatus of claim 1 wherein said first module processor, in response to receiving a telephone number from said first transceiver, determines which module processor comprises translation data for determining the identity of said second module processor wherein said second transceiver is connected to a station identified by said telephone number.

10. The apparatus of claim 1 wherein said first processor controls originating processes of a telecommunications call and said second processor controls terminating processes of said call.

11. The apparatus of claim 10, wherein said second processor controls originating processes of another telecommunications call and said first processor controls terminating processes of said another telecommunications call.

12. The apparatus of claim 10 wherein said first and said second processors are essentially identical units.

13. The apparatus of claim 1 wherein said first and said second processors are essentially identical units.

14. The apparatus of claim 1 wherein one TSI unit establishes all switching network connections for a stand-alone switching system.

15. The apparatus of claim 1 further comprising: at least one additional TSI unit;

A time multiplex switch TMS; and

Links interconnecting said TMS, said TSI unit and said at least one additional TSI unit.

16. The apparatus of claim 1 further comprising:

at least one additional TSI unit; and at least one link interconnecting said TSI unit and said at least one additional TSI unit.

* * * * *